US006514429B1

(12) United States Patent
Waschenbach et al.

(10) Patent No.: US 6,514,429 B1
(45) Date of Patent: Feb. 4, 2003

(54) COMPOSITION FOR USE IN A WATER RESERVOIR

(75) Inventors: Guido Waschenbach, Schriesheim (DE); Ralf Wiedemann, Ludwigshafen (DE); Enric Carbonell, Barcelona (ES); Edgar Endlein, Lampertheim (DE); Karl-Ludwig Gibis, Ludwigshafen (DE)

(73) Assignee: Reckitt Benckiser N.V., Hoofddorp (NL)

( * ) Notice: Subject to any disclaimer, the term of this patent is extended or adjusted under 35 U.S.C. 154(b) by 0 days.

(21) Appl. No.: 09/509,641

(22) PCT Filed: Jul. 23, 1999

(86) PCT No.: PCT/EP99/05263

§ 371 (c)(1), (2), (4) Date: Oct. 23, 2000

(87) PCT Pub. No.: WO00/06682

PCT Pub. Date: Feb. 10, 2000

(30) Foreign Application Priority Data

Jul. 29, 1998 (DE) ........................................ 198 34 172

(51) Int. Cl.$^7$ .......................... A01N 25/08; C02F 5/10; C11D 17/00

(52) U.S. Cl. .................. 252/181; 252/186.35; 424/408; 510/193; 510/194

(58) Field of Search ................................ 424/467, 473, 424/465, 469, 405, 408; 252/181, 186.35; 510/193, 194

(56) References Cited

U.S. PATENT DOCUMENTS 3,843,545 A * 10/1974 Heuston ..................... 252/181
4,460,490 A * 7/1984 Barford et al. ..... 252/186.35 X
4,673,527 A * 6/1987 Goudy, Jr. et al. .......... 252/181
4,683,072 A * 7/1987 Holdt et al. ........ 252/186.35 X
4,801,636 A 1/1989 Smith et al. ................ 524/236
4,972,017 A 11/1990 Smith et al. .................. 524/46
5,133,892 A 7/1992 Chun et al.
5,695,781 A * 12/1997 Zhang et al. ........... 424/469 X
5,756,440 A * 5/1998 Watanabe et al. ....... 510/193 X
6,001,789 A * 12/1999 Trinh et al. ............. 510/193 X

FOREIGN PATENT DOCUMENTS

| | | | |
|---|---|---|---|
| CA | 2107356 | | 11/1992 |
| DE | 2 007 413 | * | 8/1970 |
| EP | 0 284 334 | * | 9/1988 |
| EP | 0 481 547 | * | 4/1992 |
| GB | 1307387 | | 2/1973 |
| WO | WO92/20774 | * | 11/1992 |

OTHER PUBLICATIONS

JP Patent Abstract 61028441 A, Feb. 8, 1996.
Copy of PCT International Search Report for PCT/EP99/05263 dated Dec. 14, 1999.

* cited by examiner

*Primary Examiner*—Richard D. Lovering
(74) *Attorney, Agent, or Firm*—Akin Gump Strauss Hauer & Feld, L.L.P.

(57) ABSTRACT

Composition for use in a water tank in the kitchen or sanitary sector, characterized by a basic composition essentially evolving its function following addition to a first water filling of the water tank, in the form of a tablet and at least one particle, with at least one core, which comprises at least one substance evolving its function essentially following an at least partial emptying of the first water filling from the water tank and the inflow of fresh water and a covering substantially completely surrounding the core or cores comprising at least one compound, whose solubility increases with decreasing concentration of a specific ion in the surrounding medium, the at least one particle being so arranged in or on the tablet that the surface of the particle or particles is at most only partly in direct contact with the surface of the basic composition surrounding the same and the concentration of the specific ion in the local environment of the particle or particles is sufficiently high up to a substantially complete dissolving of the tablet in order to prevent a substantial dissolving of the covering or a substantial detachment of the covering from the core or cores.

45 Claims, 2 Drawing Sheets

COMPOSITION FOR USE IN A WATER RESERVOIR

CROSS-REFERENCE TO RELATED APPLICATION

This application is a Section 371 of International Application No. PCT/EP98/05263, filed Jul. 23, 1999, the disclosure of which is incorporated herein by reference.

BACKGROUND OF THE INVENTION

The present invention relates to a composition for use in a water tank in the kitchen or sanitary sector.

Such compositions are known in numerous different forms for different applications, e.g. for deliming coffee machines or for cleaning and deliming toilets as an additive to cisterns.

The aim of the invention was to permit the simultaneous charging of substances possibly not completely compatible when used simultaneously and which evolve their functions at different, defined times.

DE-OS 20 65 153 and DE-OS 20 07 413 disclose detergent pellets for use as washing agents, in which it is inter alia provided to combine two components with different functionalities. The structure is formed from a covering or enveloping shell, which is e.g. formed from two shell halves, which comprise a cleaning agent, and a cavity surrounded by the shells and which contains additives such as softeners, brighteners, etc.

British patent 1 390 503 discloses a liquid cleaning agent or detergent which contains capsules, which are insoluble in the composition, but release their content when the composition is diluted with water. This objective is achieved in that the capsules are coated with a substance, which has a poor solubility in water solutions with a high ionic strength, but which is soluble if the ionic strength is reduced by dilution. It is pointed out that this procedure can be used in order to incorporate materials into the liquid cleaning agent, which in the latter are unstable or would produce an instability if added directly. It is also proposed to use this procedure for delaying the release of a specific substance.

U.S. Pat. No. 4,082,678 describes a fabric conditioner, which comprises a closed container containing a releasable agent and which is used for making water-insoluble or non-dispersible an inner container located in the first container and which is normally water-soluble or water-dispersible, the inner container containing a fabric conditioner.

Japanese patent applications KOKAI 60-141705, 61-28440, 61-28441, 61-28596, 61-28597 and 61-28598 describe processes for the production of pH-sensitive microcapsules for use in detergents. The pH-sensitive coating is a copolymer of the following monomers:

A) at least one basic monomer of formula I:

(I)

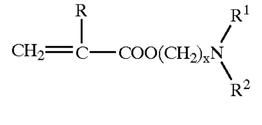

in which R is hydrogen or a methyl group and $R^1$ and $R^2$ in each case an alkyl group with 1 to 3 carbon atoms and x is an integer from 1 to 4, B) at least one monomer which is insoluble or difficultly soluble in water and C) at least one water-soluble monomer.

It is pointed out that the described polymers are insoluble at a pH-value of 9.5 or higher and are soluble at a pH-value of 8.5 or lower. Different ingredients of cleaning agent compositions are described, which can be successfully and usefully coated with the described polymers. The aim of the invention described therein is to protect substances, which only evolve their function during the rinsing process up to the start of the latter and then to release them as immediately as possible. A disadvantage of the solution described in these Japanese patent applications is that the enveloped particles are in direct contact with non-alkaline washing water at the start of the washing cycle, which can give rise to a partial dissolving of the protective covering.

Japanese patent KOKAI 50-77406 discloses a washing aid, which is surrounded by a water-soluble covering or envelope, obtained by mixing polyvinyl acetal dialkyl aminoacetate and at least one organic acid, which is solid at room temperature. This protective envelope is intended to protect the washing aid during the main washing cycle and to release it during rinsing cycles. The described compound reacts to the pH-value change between the main washing cycle and the rinsing cycle. Here again the disadvantage exists of a possible partial dissolving of the protective envelope at the start of the washing cycle.

European patent applications EP 284 191 A2 and EP 284 334 A2 disclose a water-soluble polymer film for releasing washing additives during the rinsing cycle of washing machines, remaining intact during the normal washing cycle over a range of typical temperatures and rapidly dissolving during the rinsing cycle. These applications point out that the use of pH-sensitive coatings was admittedly known, but that these films are normally also temperature-sensitive, so that they do not remain reliably stable during the different temperatures of the washing cycle. The solution proposed is a pH-dependent material (which undesirably also has a positive, temperature-dependent dissolving behaviour) which is combined with a material having a negative, temperature-dependent dissolving behaviour. This combination is supposed to guarantee that the coatings do not dissolve at the high temperatures at the start of the washing cycle (in particular the very high temperatures occurring in American machines).

European patent application EP 481 547 A1 discloses multilayer dishwashing machine tablets having a core, a separating layer surrounding the core and an outer layer for the sequential release of the ingredients of the different layers. This tablet is fundamentally intended to solve two problems, namely 1) incompatible materials can be formulated together in a single tablet and released at different times in order to avoid mutual influencing and 2) compositions, which are intended to evolve their functions at different times, can be formulated in a single tablet.

One of the disadvantages of the prior art described in this document is that the only production process described is the successive moulding of the individual components. This gives rise to the risk that the core or core envelope is deformed, which can firstly lead to damage (and therefore a reduction of the protective action) to the core envelope and secondly (as a function of the core composition) can give rise a "bleeding" of the core into the material of the envelope and the basic composition. In addition, the intimate full-surface contact between the individual layers can lead to reactions occurring in the boundary layers which are undesired, particularly between the envelope and the outer layer.

The second important disadvantage of this prior art is that for initiating the dissolving of the enveloping layer the temperature and in particular the contact time with the washing solution is used as the triggering factor, which consequently clearly limits the practical usability of the products described.

PCT application WO 95/29982 discloses a dishwashing machine rinsing agent with a delayed release of a clear rinsing agent in the form of a nonionic surfactant, which together with an inorganic builder salt forms a core particle, which is provided with a wax-like covering in order to ensure the delayed release. This covering is a substance which does not melt at the operating temperatures encountered during the cleaning cycle, but which at alkaline pH-values is so gradually chemically disintegrated that there is still an effective clear rinsing agent quantity present at the end of the main cleaning cycle and is transferred into the rinse clear cycle.

It is disadvantageous that the covering is rendered soluble by chemical saponification at alkaline pH-values, so that the time at which the clear rinsing substance is released from the core is a function both of the temperature and the length of the main cleaning cycle. The patent application contains no teaching as to how a product is to be formulated with which the clear rinsing agent can be released in all washing programs of any machine type only during the rinse clear cycle. Finally the product is a mixture of granular cleaning agents and granular clear rinsing particles.

In view of the prior art described, the problem of the present invention is to provide a composition making it possible to release at different, defined times simultaneously charged products with different functionalities. The aim is to achieve this without significant restriction to the choice of the materials to be combined together.

SUMMARY OF THE INVENTION

According to the invention this problem is solved by a composition characterized by a basic composition evolving its function essentially following addition to a first water filling of the water tank, in the form of a tablet, and at least one particle with at least one core comprising at least one substance, which evolves its function substantially after an at least partial emptying of the first water filling from the water tank and the inflow of fresh water thereto, and a covering substantially completely surround the core or cores and comprising at least one compound, whose solubility increases with decreasing concentration of a specific ion in the surrounding medium, the at least one particle being so arranged in or on the tablet that the surface of the particle or particles at the most is in partial direct contact with the surface of the basic composition surrounding the same, and the concentration of the specific ion in the local environment of the particle or particles is sufficiently high up to a substantially complete dissolving of the tablet to prevent a significant dissolving of the covering or a significant detachment of the covering from the core or cores.

Preferably the or all the particles are received in at least one tablet cavity completely surrounded by the basic composition and having a larger volume than the or all the particles received in the particular cavity.

In an alternative, the particle or particles can be loosely arranged in the interior of the cavity.

In a particularly preferred embodiment of the invention the particle or particles are fixed in the interior of the cavity.

According to the invention the particle or particles are fixed in the interior of the cavity by an adhesive.

In an alternative embodiment of the invention the cavity is placed substantially centrally in the tablet interior.

The tablet has a single, substantially spherical cavity.

According to the invention the cavity receives a single, substantially spherical particle, whose external diameter is smaller than the internal diameter of the cavity.

According to an alternative embodiment of the invention the or all the particles are received in at least one cavity of the tablet, which is only partly surrounded by the basic composition.

The cavity is preferably a depression in one of the surfaces of the tablet, in which the particle or particles are at least partially received.

The particle or particles are so received in the cavity or depression that it or they do not project over the surface or surfaces of the tablet.

According to an embodiment of the invention the cavity or depression has a substantially circular cross-sectional face parallel to one of the surfaces to which it opens or in which it is located.

According to a particular embodiment of the invention the cavity or depression only opens to such an extent to the surface or surfaces that the particles received therein cannot pass through the opening or openings of the cavity or depression.

Preferably the particle or particles are loosely arranged in the cavity or depression.

It is also possible for the particle or particles to be fixed in the cavity or depression, said fixing preferably taking place with an adhesive.

In preferred manner according to the invention the covering comprises at least one compound, which is not or is only slightly soluble at the concentration of the specific ion prior to the inflow of fresh water and at the concentration of the specific ion following the inflow of an adequate fresh water quantity has such an adequate solubility that it is so substantially dissolved or detached from the core or cores that an at least partial escape of the core material into the surrounding medium is possible.

Preferably the solubility of the compound increases with decreasing $OH^-$ ionic concentration and therefore decreasing pH-value in the surrounding medium.

Preferably the compound comprises a polymer, in particularly preferred manner a pH-sensitive polymer, which comprises at least one repeat unit, which has at least one basic function, which is not part of the polymer backbone chain.

In a preferred embodiment the polymer comprises at least one repeat unit, which is based on a compound selected from the group comprising vinyl alcohol derivatives, acrylates or alkyl acrylates having said basic function.

According to a special embodiment of the invention the polymer is a carbohydrate functionalized with said basic function.

The aforementioned basic function is preferably an amine, in particularly preferred manner a secondary or tertiary amine.

According to an alternative, the repeat unit is based on a compound having the following formula III:

(III)

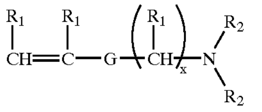

in which G is a linking group selected from —COO—, —OCO—, —CONH—, —NHCO—, —NHCONH—, —NHCOO—, —OCONH—, or —OCOO—, each $R_1$ independently of one another is hydrogen or an alkyl group with 1 to 3 carbon atoms, each $R_2$ independently of one another is hydrogen or an alkyl group with 1 to 5 carbon atoms, and x is an integer from 1 to 6.

Preferably the repeat unit is based on a compound with the following formula IV:

(IV)

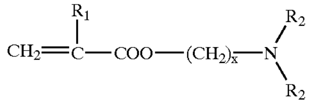

in which $R_1$ independently of one another is hydrogen or an alkyl group with 1 to 3 carbon atoms, $R_2$ independently of one another hydrogen or an alkyl group with 1 to 5 carbon atoms and x is an integer from 1 to 6.

According to another embodiment of the invention the basic function is an imine or a basic, aromatic N-containing group, preferably a pyridine group or an imidazole group.

According to a further embodiment the pH-sensitive polymer is a polymer derived from chitosan.

The invention finally proposes that the compound comprises K-carrageenan.

According to the invention the solubility of the compound increases with decreasing $H^+$ ionic concentration and therefore increasing pH-value in the surrounding medium.

The compound preferably comprises a polymer.

According to an embodiment of the invention the compound comprises a pH-value-sensitive polymer, which comprises at least one repeat unit, which is based on a compound comprising an acid function.

According to an alternative the polymer comprises at least one repeat unit, which is based on a compound selected from the group comprising vinyl alcohol derivatives, acrylates or alkyl acrylates comprising said acid function.

The polymer is preferably a carbohydrate functionalized with said acid function.

In particularly preferred manner the acid function is a carboxyl group.

According to an alternative the repeat unit is based on a compound with the following formula V:

(V)

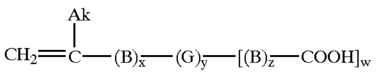

in which G is a link group selected from —COO—, —OCO—, —CONH—, —NHCO—, —NHCONH—, —NHCOO—, —OCONH— or —OCOO—, B independently of one another a hydrocarbon group selected from straight or branched, saturated or unsaturated, optionally substituted alkylene, arylene or aralkylene, Ak is hydrogen or an alkyl group, preferably with 1 to 4 carbon atoms, x, y and z independently of one another are either 0 or 1 and w is an integer from 1 to 3.

The repeat unit is preferably based on a compound with the following formula VI:

(VI)

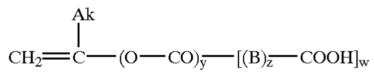

in which B independently of one another is a hydrocarbon group selected from straight or branched, saturated or unsaturated, optionally substituted alkylene, arylene or aralkylene, Ak is hydrogen or an alkyl group, preferably with 1 to 4 carbon atoms, y and z independently of one another are either 0 or 1 and w is an integer from 1 to 3.

Preferably the pH-sensitive polymer is derived from a polysaccharide by partial esterification of some of its free hydroxyl groups with a polycarboxylic acid and/or by partial etherification of some of its free hydroxyl groups with a product obtained by esterifying one mole of a polycarboxylic acid with 1 mole of a polyol.

According to the invention the core or cores comprise at least one material selected from the group consisting of fragrances, disinfectants and pH-indicators.

According to an embodiment of the invention the core or at least part of the cores is in the form of an encapsulated liquid.

In particularly preferred manner the core or at least a part of the cores is in a solid form.

The composition according to the invention is characterized in that it solves the set problem with excellent results. The basic composition in the form of a tablet is dissolved following addition to the water filling of the water tank and can evolve its corresponding, intended action (cleaning, deliming, etc.). The particle located in or on the tablet contains as the core material that substance or substances evolving their main function only after an at least partial emptying of the water tank and the inflow of fresh water. The most varied substances can be used, e.g. fragrances, disinfectants, pH-indicators, etc.

Said substance or substances are protected by a covering, which at the ionic concentration, e.g. the pH-value and optionally the temperature of the first water filling of the water tank are stable and do not or do not significantly dissolve or become detached. Only when there is a significant drop in the ionic concentration or the pH-value through an at least partial emptying of the water tank and the inflow of fresh water, i.e. by dilution, is the solubility of the covering material reduced to such an extent that it rapidly dissolves or becomes detached and the actual active core material is released into the surrounding medium.

Provided that charging does not take place by special charging or dosing aids, which can hold back the particles according to the invention, the particles according to the invention should be sufficiently large to ensure that during the emptying of the water tank they are not discharged to a significant extent.

It is important for the solution according to the invention that the surface of the particle at most is in partial direct contact with the surface of the basic composition of the tablet surrounding it. This can take place in ways specifically described and represented in the application, but also in any other way achieving the sought objective. Examples are the loose arrangement of a smaller particle in a larger cavity and fixing a smaller particle in a larger cavity in such a way that there is no or only a partial contact between the particle and the basic composition of the tablet, etc. Compared with the prior art this constellation offers the advantage that during the production process, e.g. the moulding of the individual constituents taking place in successive steps, a deformation and possibly resulting damage to the core or cores and/or the covering is reliably avoided, because this could give rise to a reduction of the protective action of the core covering. If it is ensured that no pressure is exerted on the particle during any phase of the production process, it is possible to reliably prevent that in the case of specific core compositions there can be a "bleeding" thereof into the material of the covering and the basic composition. It can finally be advantageous for specific compositions of the covering or the basic composition to avoid an intimate, full-surface contact, because otherwise undesired reactions could arise in the boundary layers.

The term "local environment", as used in connection with the particles according to the invention, indicates the immediate environment of said particles. The ionic concentration in said local environment of the particle is the determinative factor for the stability thereof. With the products according to the invention the ionic concentration in this local environment is determined at least up to a substantially complete dissolving of the tablet by the ions dissolving therefrom. Preferably the origin of the "specific ion", at least in a first phase following the addition to the water filling of the water tank, is consequently a compound from the basic composition forming the tablet or is produced by it in the surrounding medium. Typically these are OH— ions (with basic cleaning agents) or $H^+$ ions (with acid deliming agents), whose concentration can in both cases be expressed as the pH-value.

BRIEF DESCRIPTION OF SEVERAL VIEWS OF THE DRAWINGS

The invention is described in greater detail relative to the following examples and the drawings, wherein the drawings show.

DETAILED DESCRIPTION OF THE INVENTION

In the represented embodiment said cavity receives a single particle 6 comprising the core 8 and the pH or ionic concentration-sensitive covering 9, whose external diameter is slightly smaller than the internal diameter of the tablet cavity. Both in the represented embodiment, where the particle is loosely received in the cavity, and also in an embodiment where it is fixed by an adhesive applied to the cavity, it is ensured that there is no continuous, full-surface contact between the tablet material and the particle covering. This is an important aspect of the present invention in order on the one hand to prevent that the protective covering around the particle core from being damaged during the production process and on the other for minimizing possible interactions between the tablet material and the said covering, both with the aim of keeping the covering stable up to a clearly defined time.

For fixing the particle in the cavity it is obviously not only possible to use a conventional adhesive, but also other compositions and agents fulfilling the same function, e.g. a mechanical fixing such as e.g. adequate frictional engagement between tablet and particle at at least certain points or a plug connection between tablet and particle. Fixing agents between the particle and tablet can also be constituted by compounds which optionally melt or dissolve at the temperature of the first water filling.

Obviously the most varied further geometrical shapes, such as e.g. ellipsoid, cylinder, etc. are possible for the design of the cavity in the tablet or the particle received therein. The design and size of the tablet cavity and that of the particle received therein need not correspond with one another. Thus, e.g. a spherical cavity can receive a cylindrical particle. All possible further combination possibilities are conceivable within the scope of the present invention. It is also possible to fill the cavity with several smaller particles instead of a single particle.

Figure 2:
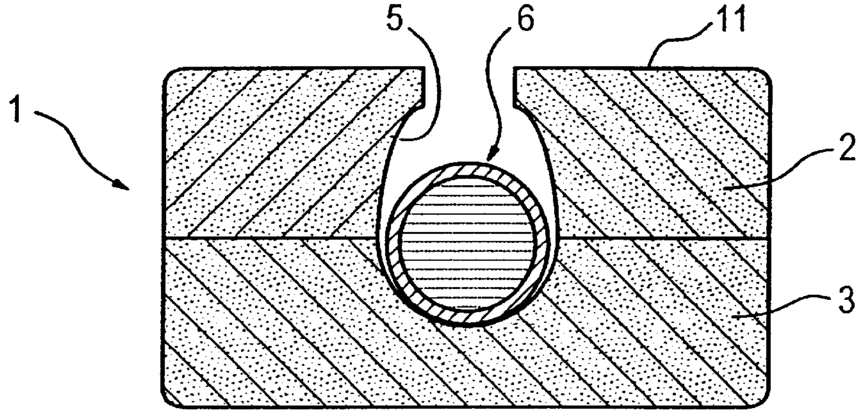
FIG. 2 A second embodiment of the composition according to the invention in cross-section.

FIG. 2 shows a second embodiment of the inventive composition based on a two-layer tablet 1. In this case the upper half-tablet 3 comprises two parts, which make available both an adequate cavity 5 for receiving the particle 6 and an opening to the tablet side 11. Thus, in this case the particle 6 is not completely surrounded by the basic composition of the tablet 1, so that it is visible from the outside in the interior of tablet 1. Here again the particle can either be loosely received in the cavity 5 (provided that it is ensured by a corresponding choice of the size of the particle 6 on the one hand and the size of the opening of the cavity 5 towards tablet side 11 on the other that the particle or particles in the cavity cannot pass through the opening) or can be fixed in the interior of the cavity 5 by a corresponding agent, such as e.g. an adhesive.

Figure 3:
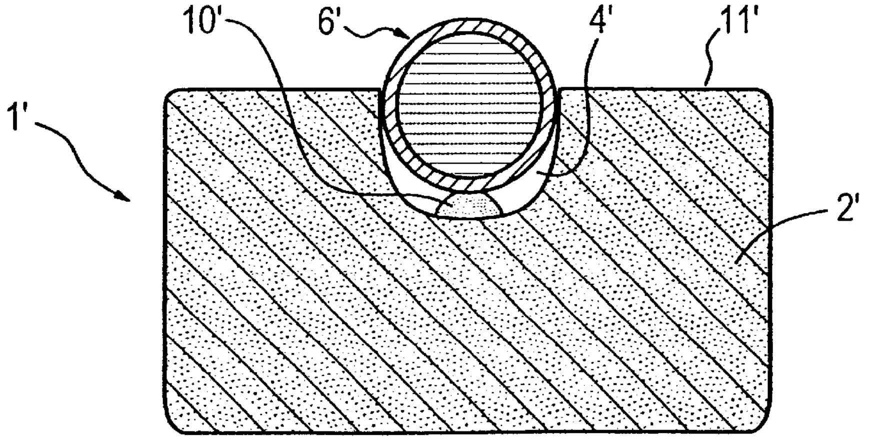
FIG. 3 A third embodiment of the composition according to the invention in cross-section.

FIG. 3 gives a third possible embodiment. The basis for this is a tablet 1', which has a uniform structure, i.e. formed by a single layer 2' with a uniform composition and colour. By means of a suitable device a depression 4' is formed in said layer 2'. Into said depression 4' is introduced the particle 6' and in this case is fixed in the depression, because the depression is open to the side 11' of the tablet 1' to such an extent that without any fixing it would be possible for the particle to drop out of the depression and fixing takes place by an adhesive 10' or a fixing intermediate layer or mechanically (e.g. by frictional engagement). This principle can obviously also be transferred to multilayer tablets.

Here again the most varied geometrical configurations are possible. Thus, the depression can e.g. have a substantially circular cross-section parallel to the side 11'. However, a random number of other cross-sections is also conceivable, e.g. any random polygon. The particle 6' received in the depression 4', as in the embodiment according to FIG. 3, can assume any random shape (independent of the shape of the depression 4'), such as e.g. an ellipsoid, cylinder, parallelepiped, etc.

Figure 4A:
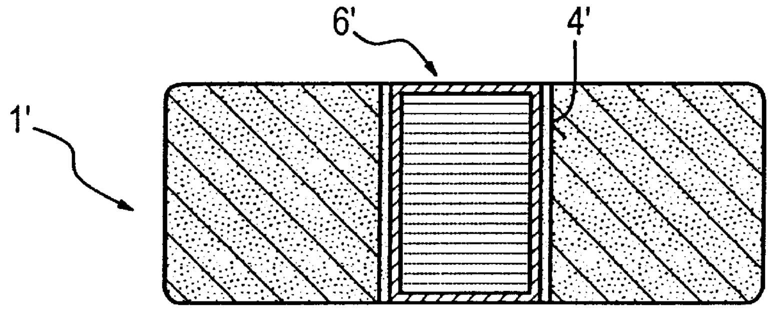
FIGS. 4*a* & *b* A fourth embodiment of the composition according to the invention in cross-section and in plan view.
Figure 4B:
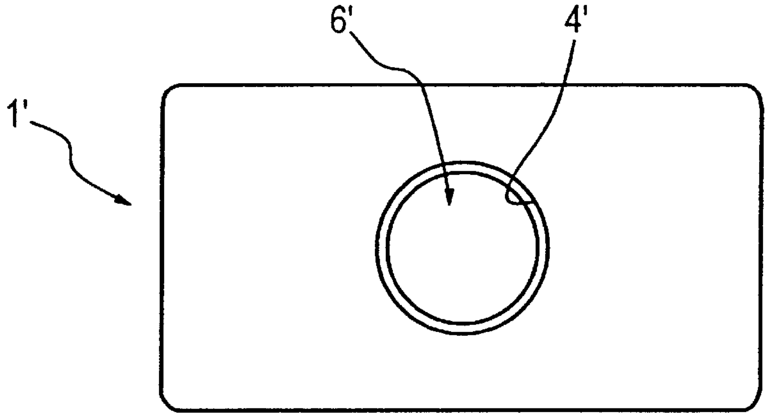

Consideration can also be given to the fixing of the particle 6' in a cavity open at both sides, such as e.g. in a cylindrical hole 4' passing through the tablet body 1' in which is fixed a corresponding, cylindrical particle 6' (FIGS. 4*a* and *b*).

Figure 5:
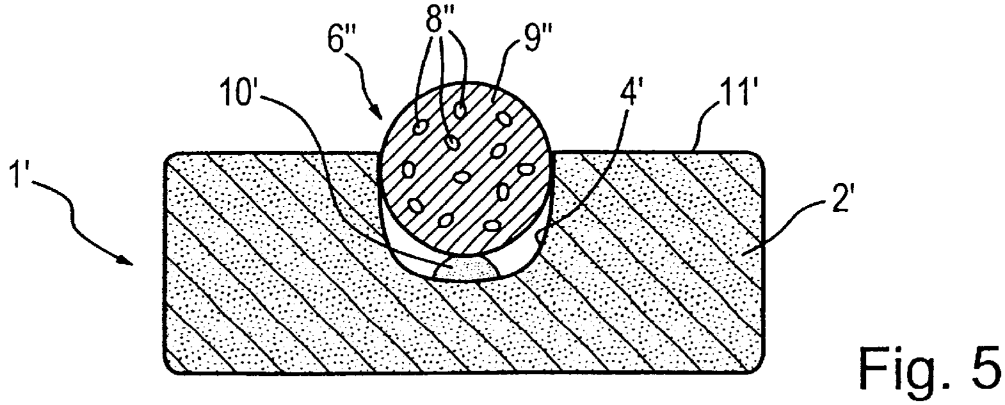
FIG. 5 A fifth embodiment of the composition according to the invention in cross-section.

FIG. 5 gives another possible embodiment. This is essentially constructed in the same way as the embodiment according to FIG. 3, i.e. a tablet 1', which has a uniform construction, i.e. only a single layer 2' and has a uniform composition and colour. In the present case the particle 6" has in place of a single core (as in FIG. 3), numerous cores 8", which are all embedded in a covering 9". In this embodiment it is e.g. also possible to incorporate cores with a different composition and different shape (encapsulated material or solid cores) in one particle 6".

EXAMPLE 1

Production of the Core a. Core for a Particle for the Controlled Release of a Fragrance Oxidizing cleaning agents used in the sanitary sector as additives to toilet cisterns, greatly restrict the choice of fragrances usable in these compositions. The release of the fragrance only at a time when the cleaning agent has substantially been removed through the running out of the water filling of the cistern permits a much greater flexibility in the use and development of fragrances.

Thus, with the composition according to the invention it is possible for the first time to combine fragrances with the cleaning agent, which would not otherwise be compatible. The tablet comprising the oxidizing cleaning agent dissolves on addition to the cistern, which releases the particle according to the invention located on or in the tablet and whose covering prevents the fragrance from being released and therefore attacked by the cleaning agent. When the cistern is emptied, i.e. the water filling mixed with the oxidizing cleaning agent flows therefrom into the toilet bowl in order to fulfil its function there, new water flows in and through the dilution, i.e. the lower pH-value "triggers" the dissolving and detachment of the particle according to the invention and therefore releases the fragrance-containing core, which can now evolve its action in the cistern and during the first outflow into the toilet bowl.

For example, such a fragrance-containing core can be produced in that a molten mixture of 50% melted PEG 8000, 25% fragrance and 25% diethyl phthalate is cooled, in order to give e.g. a spherical particle with a weight of e.g. 0.75 g.

b. Core for a Particle for the Controlled Release of a Disinfectant

The optimum bactericidal action of a disinfectant such as benzalkonium chloride is obtained under neutral or alkaline conditions. Thus, if benzalkonium chloride is used in acid cleaning agents (for deliming) its efficiency is below the optimum.

In the case of the composition according to the invention an acid cleaner tablet for dosing into a toilet cistern can be combined with a particle according to the invention, whose core contains benzalkonium chloride as the disinfectant. On adding to the cistern the tablet dissolves and the inventive particle is released, its covering preventing the release of the disinfectant in the acid medium in question. As soon as the cistern is emptied in order to allow the acid cleaning liquor to drain into the toilet bowl so that it can evolve its action, through the inflowing fresh water the dissolving or detachment of the covering of the particle left behind in the cistern is "triggered", so that the content can be released from its core and can evolve its optimum action under the given neutral conditions.

A corresponding core for such a particle can e.g. be produced in that a molten mixture of 98% melted benzalkonium chloride and 2% blue dye is cooled in order to form a particle weighing e.g. 0.64 g.

c. Production of a Particle for the Release of a pH-Indicator

If coffee machines are treated with an acid composition (for deliming purposes), it is not possible to readily establish whether the acid used has completely been rinsed out following the treatment. Through the use of an acid tablet with a core containing a pH-indicator, which is only released in the case of adequate dilution, the implementation of such a function would become possible.

Such a core particle could e.g. comprise 1 g of a mixture consisting of 99.7% sodium chloride and 0.3% of a corresponding indicator (e.g. methyl orange or bromocresol green).

EXAMPLE 2

Screening Process for Covering Materials

As stated hereinbefore, it is of great importance for the present invention that the material for the covering of the particle core or cores comprises the substance or substances evolving their function essentially only after an at least partial emptying of the water tank and the inflow of fresh water, only has a solubility which is dependent on the concentration of a specific, selected ion. In this way the covering is substantially insoluble in that water filling of the water tank, whose ionic concentration is determined by the dissolving of the tablet, and is made soluble and is detached from the particle if the ionic concentration drops following an at least partial emptying of the water tank and the inflow of fresh water.

It has been observed that the dilution, due to the at least partial draining of the water filling of the water tank with dissolved tablet and the inflow of fresh water, reduces the ionic concentration 10 to 100 times, i.e. for example raises or lowers the pH-value by 1 to 2 units.

On the basis of this observation processes have been developed for the screening of the suitability of different polymers for their use as covering or enveloping materials, which comprises the determination of the solubility of such polymers at two different ionic concentrations, which differ by at least 10 and preferably 100 times.

The ionic concentration values to be used during polymer screening are dependent on the formulation of the basic composition of the tablet into which the enveloped or covered particle is to be incorporated.

The value for the highest ionic concentration used for the screening process should correspond to the concentration of the selected ion, which is encountered in the first filling of the water tank, after the basic composition of the tablet has completely dissolved. When this concentration has been determined the lower value for the ionic concentration should be fixed at 10 to 100 times below this higher value.

On the basis of this information it falls within the routine capacity and knowledge of an expert in this field to determine the ionic concentration values of the test solutions to be used in the testing processes described hereinafter.

Process for the Preparation of the Test Solution and for Performing and Evaluating the Tests The materials to be tested are dissolved in solvents in which they are readily soluble. The solutions are spread over glass plates, then dried at room temperature until they have a constant weight.

At a controlled temperature the glass plates are placed in a beaker with the test solution. The solution is then stirred with a magnetic stirrer at a controlled stirring rate. After about 10 minutes the glass plates are removed from the beaker and dried at room temperature to a constant weight. The results are expressed as a weight loss (%).

Obviously the screening processes must be adapted to the basic composition, because this exercises the essential influence on the ionic concentration or pH-profile in the water tank. The aim in all cases is to check the degree of solubility of the corresponding materials at different states, namely high or low ionic concentration or pH-value.

On the basis of this information it falls within the routine capacity of an expert in this field to provide the specific test parameters for the screening. For example hereinafter two screening processes are described with which some of the possible materials for the covering of the particle according to the invention were tested.

Screening process 1

Screening process 1A was performed with buffer solutions as the medium for simulating an alkaline medium. To this end two buffer solutions were prepared in the following way:

Stock solution: 7.507 glycine buffer (Merck 104169)
 5.850 g NaCl
 topped up with water to 1000 ml
pH 8-buffer solution: 500 ml stock solution
 500 ml distilled $H_2O$
 1.23 g 1 N NaOH
pH 10-buffer solution: 500 ml stock solution
 500 ml distilled $H_2O$
 32.6 g 1 N NaOH.

Screening process 1B was performed with buffer solutions as the medium for simulating an acid medium. For this purpose use was made of two buffer solutions commercially available from Merck, namely a citrate/HCl buffer solution with a pH-value of 3 and a citrate/NaOH buffer solution with a pH-value of 6.

Screening process 2

Screening processes 2A and 2B were performed with the following basic composition formulations, in order to simulate corresponding conditions in a water tank, e.g. a toilet cistern.

The corresponding compositions were dissolved in water with 17% dH with the two different concentrations 2 g/l and 0.02 g/l.

Screening process 2A

Alkaline Formulation:

| Ingredient | wt. % |
|---|---|
| Sodium perborate monohydrate | 9.00 |
| Sodium tripolyphosphate | 48.00 |
| Sodium carbonate | 28.00 |
| Polyethylene glycol | 4.00 |
| Polymer | 1.50 |
| TAED | 3.00 |
| Enzymes | 1.50 |
| Surfactant | 3.50 |
| Additives | 1.50 |
| Total | 100.00 |

Screening process 2B

Acid formulation:

| Ingredient | wt. % |
|---|---|
| Amidosulphuric acid | 56 |
| Maleic acid | 24 |
| Sodium bicarbonate | 20 |

Screening process 3

Screening process 3 is used for screening for compounds, whose solubility changes as a function of the concentration of potassium ions. The compounds found with such a screening process can be used if in the water tank, as described above, there is a correspondingly high potassium ion concentration and which is to be correspondingly reduced by the inflow of fresh water.

Screening process 3 was performed with the following formulation in order to simulate corresponding conditions.

Formulation:

| Ingredient | wt. % |
|---|---|
| Potassium triphosphate | 13.6 |
| Potassium bicarbonate | 34.0 |
| Potassium sulphate | 23.1 |
| Potassium chloride | 12.4 |
| Potassium carbonate | 9.7 |
| Boric acid | 2.0 |
| Sodium perborate monohydrate | 2.0 |
| TAED | 1.0 |
| Paraffin | 1.0 |
| Protease | 0.2 |

EXAMPLE 3

Choice of Materials for Covering the Particles

Using the screening process described in example 2 different materials were tested for their suitability as a covering for the particles according to the present invention. One of these materials, hereinafter called "Polymer 1" is a polymer as described in Japanese patent application KOKAI 61-28440, i.e. a polymer of general formula II with 1/(1+m+n)=0.35; m/(1+m+n)=0.45; 1+m+n=1500–1800.

(II)

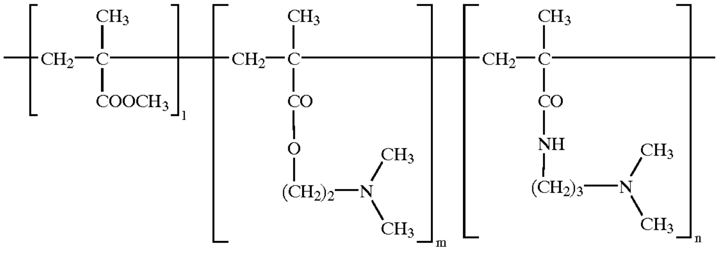

The polymer was produced in conventional manner by bulk polymerization. The screening test results were as follows:

Screening process 1A:

Films of polymer 1 were produced from a 10% solution in isopropanol.

| pH-value of buffer solution | weight loss at 30° C. [%] |
|---|---|
| 10 | 7–8 |
| 8 | 81–88 |

Screening process 2A gave similar good results.

The invention is obviously not restricted to this exemplified polymer and naturally there is a considerable variation possibility with respect to the polymers mentioned in Japanese patent applications KOKAI 60-141705, 61-28440, 61-28441, 61-28596, 61-28597 and 61-28598 or can be extended to compounds of formula IV:

(IV)

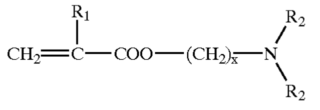

in which $R_1$ independently of one another is hydrogen or an alkyl group with 1 to 3 carbon atoms, $R_2$ independently of one another hydrogen or an alkyl group with 1 to 5 carbon atoms and x is an integer from 1 to 6.

Moreover, within the larger class of compounds according to formula III:

(III)

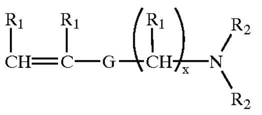

in which G is a link group selected from —COO—, —OCO—, —CONH—, —NHCO—, —NHCONH—, —NHCOO—, —OCONH— or —OCOO—, $R_1$ independently of one another is hydrogen or an alkyl group with 1 to 5 carbon atoms and x is an integer from 1 to 6, in exemplified manner it is possible to use polymers with a repeat unit based on a compound of formula VII:

(VII)

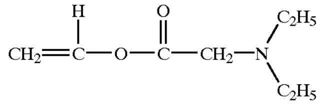

e.g. a pH-sensitive polymer ("Polymer 2") with the repeat unit VIII commercially obtainable under the trademark AEA® from SANKYO:

(VIII)

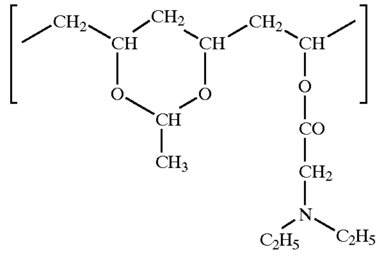

The above-described screening process 2A was also performed with "Polymer 2".

15 g of "Polymer 2" and 5 g of Mowiol® 3-98 (Clariant) were dissolved in 200 ml of a mixture of water/ethanol/1N HCl 12:8:1. Films were formed and tested in the manner described hereinbefore. The results were comparable with those of "Polymer 1".

Further polymers having the desired characteristics or which can be simply modified so as to make them suitable for the purposes of the present invention, are polymers of isomers or derivatives of pyridine, preferably copolymers with styrene or acrylonitrile, having the following formulas IX and X, in which G is a substituent at a random point of the pyridine ring:

(IX)

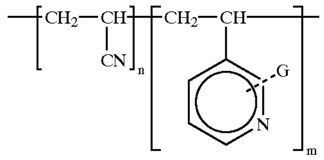

(X)

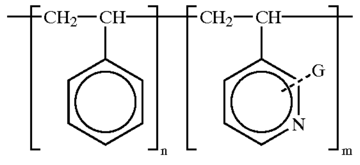

A polymer according to the above formula X, namely poly(4-vinylpyridine-styrene) copolymer (Scientific Polymer Products Inc.), namely "Polymer 3" was tested in accordance with the above-described screening process 2A.

10 g of "Polymer 3" were dissolved in 230 ml of water/1N HCl 6.25:1. The formation of films and the performance of the tests were as described hereinbefore. The results were comparable with those for "Polymer 1" and "Polymer 2".

Further polymers are (e.g. random) polymers derived from chitosan, based on the following monomer units XI and XII:

(XI)

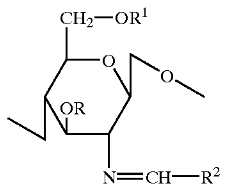

-continued (XII)

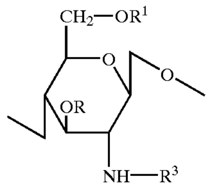

In the case where there is a pH-value change from acid to neutral, the following exemplified specific polymers proved suitable in screening processes 1B and 2B:

1. Polyvinyl acetatophthalate

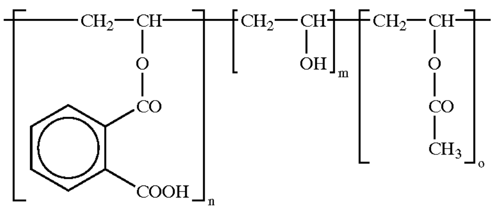

2. Hydroxylpropyl cellulose phthalate

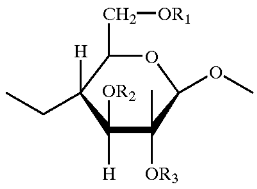

in which $R_1$, $R_2$ and $R_3$ are selected independently of one another from the group comprising methyl, ethyl, carboxymethyl, hydroxyethyl, acetyl,

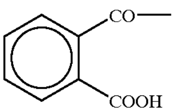

and

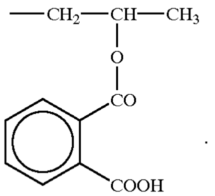

.

3. Acrylic acid/ethyl acrylate copolymer

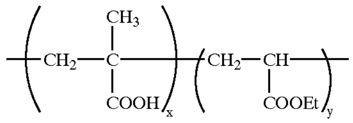

It is possible to use in the covering of the core material substances or substance mixtures which, with respect to their solubility behaviour, react to a change in the ionic concentration, i.e. ionic concentration-sensitive polymers. It is e.g. possible to use the partly hydrolyzed polyvinyl acetates (commercially available under the trade name Mowiol®-Clariant) described in EP 284 191 A2 and EP 284 334 A2, which have a corresponding ionic concentration dependence in the presence of borates due to the complexing of the borates with polyols. Initial successful tests were carried out with Mowiol® 56–88.

Another ionic concentration-sensitive polymer is the polysaccharide K-carrageenan, which was proved in screening process 3 (cf. example 2) to be a polymer whose solubility is dependent on the potassium ion concentration in the surrounding medium. As shown, K-carrageenan has the following formula XI:

(XI)

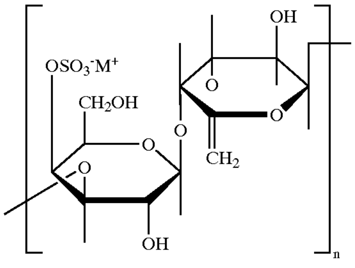

This polymer, called "Polymer 4", was tested in accordance with the above-described screening process 3.

4 g of K-carrageenan were dissolved in 96 g of water. 10 g of Mowiol® 18–88 were dissolved in 90 g of water and both solutions were mixed. The resulting solution was used for forming films and performing tests, in the manner described hereinbefore. The following results were obtained:

| Cleaning agent concentration | Weight loss at 30° C. [%] |
|---|---|
| 4 g/l | 0.5–3.0 |
| 0.02 g/l | 24.5–25.0 |

The above list of compounds suitable for the covering according to the invention is obviously non-exhaustive. Further polymers changing their solubility by modifying the pH-value or ionic concentration in the desired range, are conceivable or can be developed and are consequently covered by the protective scope of the present invention. In addition, substances suitable for the covering according to the invention are not limited to polymeric compounds, although such compounds are described here as preferred embodiments.

With the aid of the afore mentioned screening processes or those adapted to the measurement of an ionic concentration sensitivity, various other commerically available materials or materials obtainable by simple modifications, can be investigated for their suitability in the present invention. The choice of such polymers is a problem easily solvable by the average expert in view of the clear aims and the indicated screening processes.

EXAMPLE 4

Production of a Particle According to the Invention

The different cores described in example 1 were used as a basis for the production of particles according to the invention. The cores were provided individually or in a plurality (FIG. 5) with a covering in an apparatus for applying a film coating of the type known from the pharmaceutical industry (e.g. Lodige, Huttlin, GS, Manesty and Driam).

In cases where the core or cores have an ingredient with a certain incompatibility with the material of the covering, said core or cores can be provided with a protective coating prior to the application of said covering. It is possible to use various prior art materials for this purpose, such as e.g. cellulose, cellulose derivatives, polyvinyl alcohol, polyvinyl alcohol derivatives and mixtures thereof. When using the cores of example 1, for 1a use was made of a protective coating and preferably use was made of a 10 wt. % aqueous solution of a polyvinyl alcohol, e.g. Mowiol® 5–88 (Clariant). The applied coating quantity can be varied and correspondingly adapted by the expert as a function of the core composition. The cores produced in examples 1b and 1c were directly provided with the covering according to the invention without any additional protective coating.

The covering can be applied to the core or cores or protective coating in any random quantity and thickness, provided that it is ensured that when fresh water flows in the covering sufficiently rapidly dissolves or becomes detached, so that the substance contained in the core or cores can evolve its action. In a preferred embodiment to the cores were applied 1 to 10, preferably 4 to 8 wt. % of the ionic concentration-sensitive covering material (solids), based on the total particle weight.

EXAMPLE 5

Figure 1:
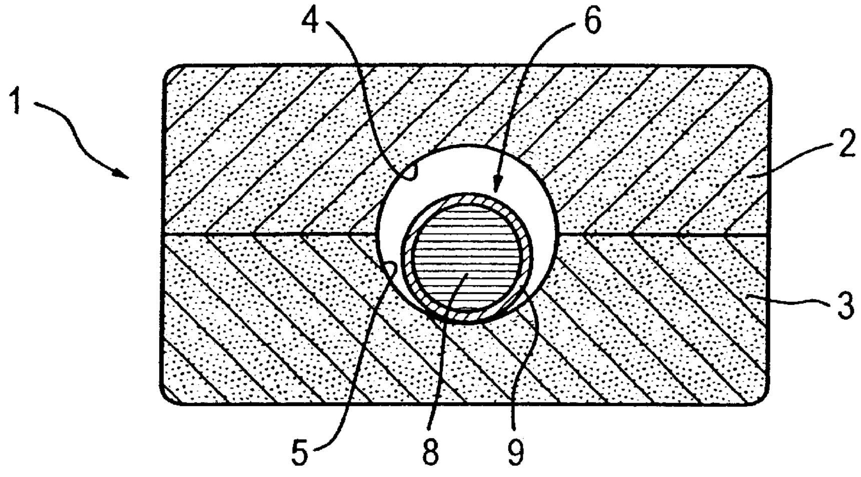
FIG. 1 A first embodiment of the composition according to the invention in cross-section.

Production of Tablets According to the Invention a. Production of a Tablet for use in a Coffee Machine A two-layer tablet suitable for receiving an inventively covered particle in accordance with examples 1c and 4 in a cavity formed in the tablet, can be produced by moulding the pulverulent ingredients in machines known from the prior art and using operating parameters known from the prior art. One possible shape of such a tablet is a parallelepipedic tablet formed from two substantially identically thick layers, a hemispherical recess being formed in the large face of each of these layers, so that on joining together the two half-tablets a substantially spherical cavity is formed in the interior (cf. FIG. 1).

The tablet composition can be gathered from the following table 2, both half-tablets being produced with the same composition by compression under a pressure of approximately 900 kg/cm

TABLE 2

| Ingredient | wt. % |
|---|---|
| Amidosulphuric acid | 56 |
| Maleic acid | 24 |
| Sodium bicarbonate | 20 |

The total weight of the two half-tablets together is e.g. 20 g. The cavity resulting from the joining together of the half-tablets should have an internal diameter larger than the external diameter of the particle according to the invention.

The particle produced according to examples 1c and 4 was introduced into the hemispherical recess of one of the two half-tablets. This was followed by the application of a fixing substance, e.g. an adhesive (e.g. polyethylene glycol, polyvinyl ether, polyvinyl alcohol, silicate, preferably melted PEG 4000) to the corresponding face of the half-tablet and then the second half-tablet is pressed onto the first.

b. Producing a Tablet for use in a Toilet Cistern

A two-layer tablet suitable for receiving an inventively covered particle according to examples 1a and 4 in a cavity formed in the tablet, can be produced by moulding the pulverulent ingredients substantially in accordance with examples 5a.

The composition of the tablet can be gathered from the following table 3, both half-tablets being produced with the same composition by compression under a pressure of approximately 800 kg/cm$^2$.

TABLE 3

| Ingredient | wt. % |
|---|---|
| Sodium tripolyphosphate | 20.0 |
| Sodium carbonate | 10.0 |
| Sodium bicarbonate | 20.0 |
| Trisodium NTA | 8.0 |
| Sodium metasilicate | 20.0 |
| Sodium sulphate | 8.0 |
| Sodium dichloroisocyanurate | 8.0 |
| Polymer | 1.5 |
| Nonionic surfactant | 4.5 |

The total weight of the two half-tablets together is e.g. 23 g.

c. Producing a Tablet for use in a Toilet Cistern

A two-layer tablet suitable for receiving an inventively covered particle according to examples 1a and 4 in a cavity formed in the tablet, can be produced by moulding the pulverulent ingredients substantially in accordance with example 5a. The tablet composition can be gathered from the following table 4.

TABLE 4

| Ingredient | wt. % |
|---|---|
| Potassium triphosphate | 13.6 |
| Potassium bicarbonate | 34.0 |
| Potassium sulphate | 23.1 |
| Potassium chloride | 12.4 |
| Potassium carbonate | 9.7 |
| Boric acid | 2.0 |
| Sodium perborate monohydrate | 2.0 |
| TAED | 1.0 |
| Paraffin | 1.0 |
| Protease | 0.2 |

d. Producing a Tablet for use in a Toilet Cistern

A two-layer tablet suitable for receiving an inventively covered particle according to examples 1b and 4 in a cavity formed in the tablet, can be produced by moulding the pulverulent ingredient substantially in accordance with example 5a.

The tablet composition can be gathered from the following table 5, the two half-tablets being produced with the same composition by compression under a pressure of approximately 900 kg/cm$^2$.

TABLE 5

| Ingredient | wt. % |
|---|---|
| Amidosulphuric acid | 56 |
| Maleic acid | 24 |
| Sodium bicarbonate | 20 |

The total weight of the two half-tablets together is e.g. 20 g.

The features of the invention disclosed in the description, claims and drawings can be essential to the implementation of the different embodiments of the invention, either singly or in random combination.

What is claimed is:

1. Composition for use in a water tank characterized by a base composition (2; 3; 2') in the form of a tablet (1; 1'), which evolves its function essentially following addition to a first filling of the water tank, and at least one particle (6; 6'; 6") having at least one core (8; 8'; 8") comprising at least one substance evolving its function substantially following an at least partial emptying of the first filling from the water tank and inflow of fresh water to the same and a covering (9; 9'; 9") substantially surrounding the core or cores and comprising at least one compound, whose solubility increases with decreasing concentration of a specific ion in the surrounding medium, in which the at least one particle (6; 6'; 6") is so placed in or on the tablet (1; 1') that the surface of said particle is only partly in direct contact with the surface of the base composition (2; 3; 2') surrounding the same and the concentration of the specific ion in the local environment of the particle is sufficiently high to prevent a significant dissolving of the covering or a significant detachment of the covering from the core or cores.

2. Composition according to claim 1, characterized in that the particle or all the particles (6) are received in at least one cavity (4, 5) of the tablet (1) completely surrounded by the base composition (2, 3) and having a larger volume than the particle or all the particles (6) received in the particular cavity.

3. Composition according to claim 2, characterized in that the particle or particles (6) are loosely arranged in the interior of the cavity (4, 5).

4. Composition according to claim 2, characterized in that the cavity (4, 5) is substantially centrally arranged in the interior of the tablet (1).

5. Composition according to claim 2, characterized in that the particle or particles (6) are fixed in the interior of the cavity (4, 5).

6. Composition according to claim 5, characterized in that the particle or particles (6) are fixed by an adhesive in the interior of the cavity (4, 5).

7. Composition according to claim 2, characterized in that the tablet (1) has a single, substantially spherical cavity (4, 5).

8. Composition according to claim 7, characterized in that the cavity (4, 5) receives a single, substantially spherical particle (6), whose external diameter is smaller than the internal diameter of the cavity.

9. Composition according to claim 1, characterized in that the particle or all the particles (6'; 6") are received in at least one cavity (4') of the tablet (1') and which is only partly surrounded by the base composition (2').

10. Composition according to claim 9, characterized in that the cavity has a depression (4') in one of the surfaces (11') of the tablet (1') in which the particle or particles (6'; 6") are at least partly received.

11. Composition according to claim 10, characterized in that the cavity or depression (4') is only open so wide to the surface or surfaces (11') that the particle or particles (6'; 6") received therein cannot pass through the opening or openings of the cavity or depression (4').

12. Composition according to claim 11, characterized in that the particle or particles (6'; 6") are loosely arranged in the cavity or depression (4').

13. Composition according to claim 10, characterized in that the particle or particles (6'; 6") are so received in the cavity or depression (4') that they do not project over the surface or surfaces (11') of the tablet (1').

14. Composition according to claim 13, characterized in that the cavity or depression (4') is parallel to one of the surfaces (11'), to which it is open or in which it is located, and has a substantially circular cross-sectional face.

15. Composition according to claim 14, characterized in that the particle or particles (6'; 6") are fixed in the cavity or depression (4').

16. Composition according to claim 15, characterized in that the particle or particles (6'; 6") are fixed with an adhesive (10') in the cavity or depression (4').

17. Composition according to claim 1, characterized in that the covering (9; 9'; 9") comprises at least one compound, which is not or is only slightly soluble at the concentration of the specific ion prior to the inflow of fresh water and in which the concentration of the specific ion following the inflow of an adequate quantity of fresh water has a solubility such that it is so substantially dissolved or detached from the core or cores that there is an at least partial escape of the core material into the surrounding medium.

18. Composition according to claim 17, characterized in that the compound comprises K-carrageenan.

19. Composition according to claim 17, characterized in that the solubility of the compound increases with decreasing $OH^-$ ionic concentration and therefore decreasing pH-value in the surrounding medium.

20. Composition according to claim 19, characterized in that the compound comprises a polymer.

21. Composition according to claim 20, characterized in that the compound comprises a pH-sensitive polymer comprising at least one repeat unit, which has at least one basic function which is not part of the backbone chain of the polymer.

22. Composition according to claim 21, characterized in that the polymer comprises at least on repeat unit based on a compound selected from the group consisting of one or more vinyl alcohol derivatives, acrylates, and alkyl acrylates comprising said basic function.

23. Composition according to claim 21, characterized in that the basic function is an amine.

24. Composition according to claim 21, characterized in that the polymer is a carbohydrate functionalized with said basic function.

25. Composition according to claim 24, characterized in that the polymer is derived from chitosan.

26. Composition according to claim 21, characterized in that the basic function is an amine.

27. Composition according to claim 26, characterized in that the basic function is a secondary or tertiary amine.

28. Composition according to claim 27, characterized in that the repeat unit is based on a compound with the following formula III:

(III)

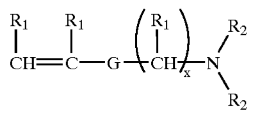

in which G is a link group selected from the group consisting of —COO—, —OCO—, —CONH—, —NHCO—, —NHCONH—, —NHCOO—, —OCONH—, and —OCOO, each $R_1$ independently of one another is hydrogen or an alkyl group with 1 to 3 carbon atoms, each $R_2$ independently of one another is hydrogen or an alkyl group with 1 to 5 carbon atoms, and x is an integer from 1 to 6.

29. Composition according to claim 28, characterized in that the repeat unit is based on a compound with the following formula IV:

(IV)

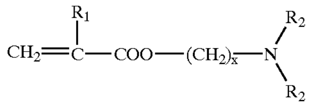

30. Composition according to claim 21, characterized in that the basic function is a basic aromatic N-containing group.

31. Composition according to claim 30, characterized in that the basic function is a pyridine group.

32. Composition according to claim 30, characterized in that the basic function is an imidazole group.

33. Composition according to claim 17, characterized in that the solubility of the compound increases with decreasing $H^+$ ionic concentration and therefore increasing pH-value in the surrounding medium.

34. Composition according to claim 33, characterized in that the compound comprises a polymer.

35. Composition according to claim 34, characterized in that the compound comprises a pH-sensitive polymer comprising at least one repeat unit, which is based on a compound comprising an acid function.

36. Composition according to claim 35, characterized in that the polymer comprises at least one repeat unit, which is based on a compound selected from the group consisting of one or more vinyl alcohol derivatives, acrylates, and alkyl acrylates comprising said acid function.

37. Composition according to claim 35, characterized in that the polymer is a carbohydrate functionalized with said acid function.

38. Composition according to claim 37, characterized in that the polymer is derived from a polysaccharide by partial esterification of some of its free hydroxyl groups with a polycarboxylic acid and/or by partial etherification of some of its free hydroxyl groups with a product obtained through the esterification of 1 mole of a polycarboxylic acid with 1 mole of a polyol.

39. Composition according to claim 35, characterized in that the acid function is a carboxyl group.

40. Composition according to claim 39, characterized in that the repeat unit is based on a compound with the following formula V:

(V)

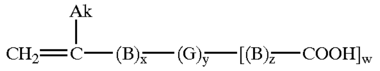

in which G is a link group selected from the group consisting of —COO—, —OCO—, —CONH—, —NHCO—, —NHCONH—, —NHCOO—, —OCONH—, and —OCOO, each B independently of one another is a hydrocarbon group selected from the group consisting of straight or branched, saturated or unsaturated, and optionally substituted alkylenes, arylenes, and aralkylenes, Ak is hydrogen or an alkyl group, each of x, y, and z independently of one another is either 0 or 1, and w is an integer from 1 to 3.

41. Composition according to claim 40, characterized in that the repeat unit is based on a compound with the following formula VI:

(VI)

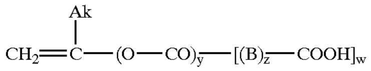

42. The composition according to claim 40, characterized in that Ak is an alkyl group with 1 to 4 carbon atoms.

43. Composition according to claim 1, characterized in that the core or cores (8; 8'; 8") comprise at least one material selected from the group consisting of fragrances, disinfectants and pH-indicators.

44. Composition according to claim 43, characterized in that the core (8; 8'; 8") or at least part of the cores (8") is present in the form of an encapsulated liquid.

45. Composition according to claim 43, characterized in that the core (8; 8') or at least a part of the cores (8") is present in a solid form.

* * * * *